(12) United States Patent
Tung et al.

(10) Patent No.: US 8,248,770 B2
(45) Date of Patent: Aug. 21, 2012

(54) MOUNTING APPARATUS FOR EXPANSION CARD

(75) Inventors: Chien-Chih Tung, Taipei Hsien (TW); Wen-Chen Wang, Taipei Hsien (TW); Chung-Ping Liu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 229 days.

(21) Appl. No.: 12/687,890

(22) Filed: Jan. 15, 2010

(65) Prior Publication Data

US 2011/0051365 A1 Mar. 3, 2011

(30) Foreign Application Priority Data

Aug. 31, 2009 (CN) .......................... 2009 1 0306395

(51) Int. Cl.
*H05K 5/00* (2006.01)

(52) U.S. Cl. ................. 361/679.02; 361/732; 312/223.2

(58) Field of Classification Search ............. 361/679.02, 361/724–727, 752, 732, 736, 748; 312/223.1–223.2
See application file for complete search history.

(56) References Cited

U.S. PATENT DOCUMENTS

| 5,909,359 | A  | * | 6/1999 | Summers et al. ............. 361/748 |
| 6,738,261 | B2 | * | 5/2004 | Vier et al. ..................... 361/740 |
| 7,035,117 | B2 | * | 4/2006 | Chen et al. .................... 361/801 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A mounting apparatus is adjusted to selectively mount a first expansion card with a supporting extension and a second expansion card without a supporting extension. The mounting apparatus includes a bracket, a first retaining member, and a second retaining member. The first retaining members are attached to the bracket to mount the first expansion card within the bracket. The second retaining member is attached to the bracket and partially shields the first retaining member to mount the second expansion card.

14 Claims, 6 Drawing Sheets

MOUNTING APPARATUS FOR EXPANSION CARD

BACKGROUND

1. Technical Field

The disclosure relates to mounting apparatuses and, more particularly, to a mounting apparatus for mounting expansion cards.

2. Description of Related Art

Long expansion cards are generally installed in a chassis of an electronic device such as a computer or a server with mounting apparatus engaging with cover plates attached to first ends thereof. Second ends of the long expansion cards always require mounting apparatuses. However, some of the long expansion cards have supporting extensions formed at the second ends thereof while others lack any. Each predetermined mounting apparatus is uniquely designed for a particular kind of long expansion card only.

DETAILED DESCRIPTION

Figure 1:
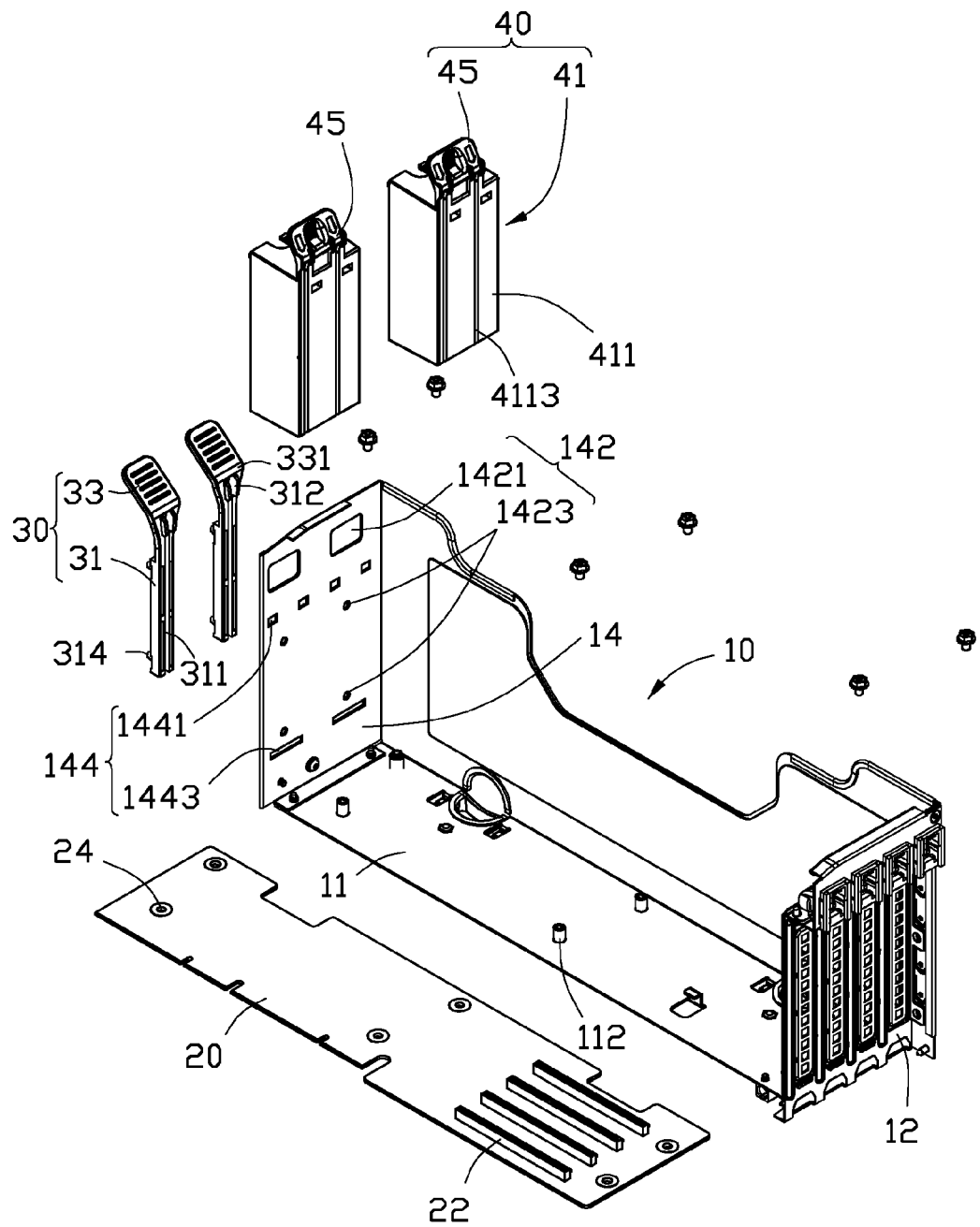
FIG. 1 is an exploded, isometric view of an exemplary embodiment of a mounting apparatus for mounting expansion cards, the mounting apparatus includes a bracket, a pair of first retaining members, and a pair of second retaining members.
Figure 5:
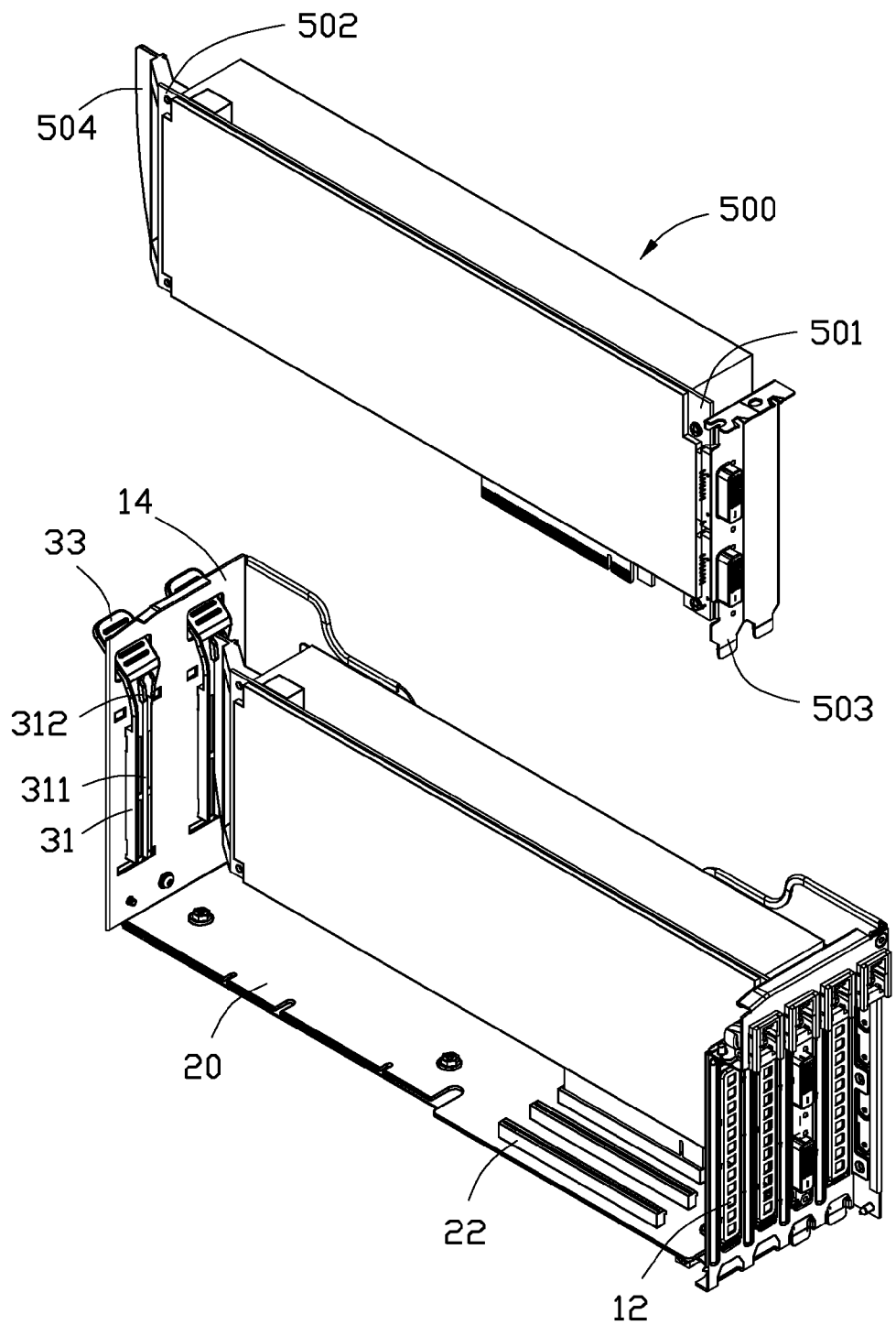
FIG. 5 is an isometric view of the mounting apparatus of FIG. 3 and two first expansion cards, one of which is mounted in the bracket.
Figure 6:
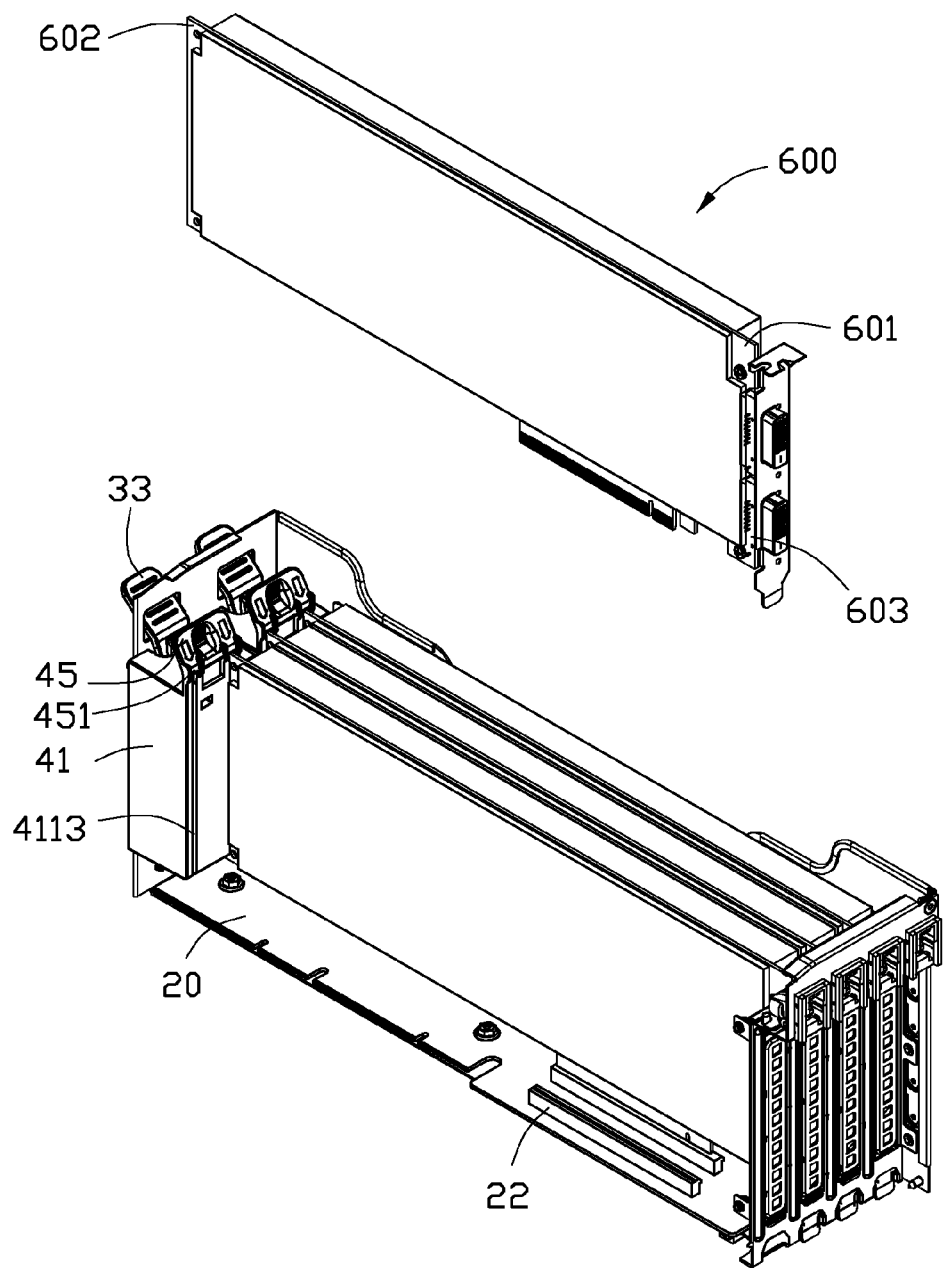
FIG. 6 is an isometric view of the mounting apparatus of FIG. 4 and four second expansion cards, three of which are mounted in the bracket.

Referring to FIGS. 1, 5 and 6, an exemplary embodiment of a mounting apparatus is provided which can be adjusted to selectively accept different kinds of expansion cards mounted therein. The mounting apparatus includes a bracket 10, a pair of first retaining members 30 for retaining first expansion cards 500, and a pair of second retaining members 40 for retaining differently-sized second expansion cards 600.

Figure 2:
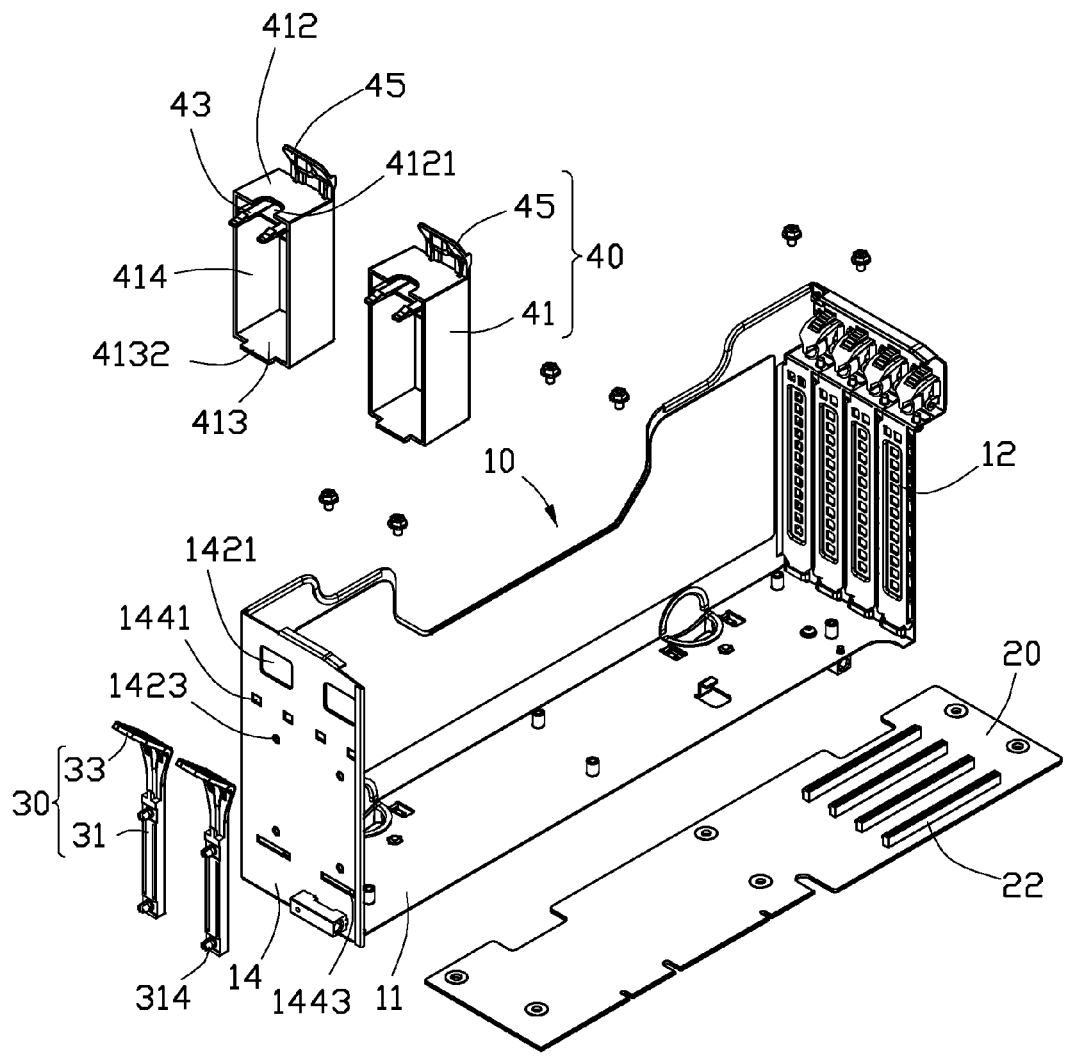
FIG. 2 is similar to FIG. 1, but viewed from another perspective.

Referring also to FIG. 2, the bracket 10 includes a base wall 11, a first sidewall 12, and a second sidewall 14 opposite to the first sidewall 12. The second sidewall 14 includes a first mounting unit 142 for mounting the first retaining members 30, and a second mounting unit 144 for mounting the second retaining members 40. The first mounting unit 142 includes a line of two rectangular openings 1421, and two lines of four through apertures 1423 below the openings 1421. The second mounting unit 144 includes a line of four rectangular through holes 1441 located between the line of the openings 1421 above the upper line of the through apertures 1423, and a line of two long slits 1443 located below the lower line of the through apertures 1423. The base wall 11 includes two pairs of mounting posts 112, for attaching a circuit board 20 thereon. The circuit board 20 includes two pairs of mounting holes 24 corresponding to the mounting posts 112, and a plurality of sockets 22.

Each of the first retaining members 30 includes a bar 31, and a resilient curved handle 33 slantingly extending from one end of the bar 31. The bar 31 includes a sliding slot 311 defined in a first side thereof, and a pair of spaced guiding tabs 312 extending from the first side above the sliding slot 311. The bar 31 includes a pair of split posts 314 extending from a second side thereof opposite to the first side. The handle 33 includes a block flange 331 located above the guiding tabs 312.

Figure 4:
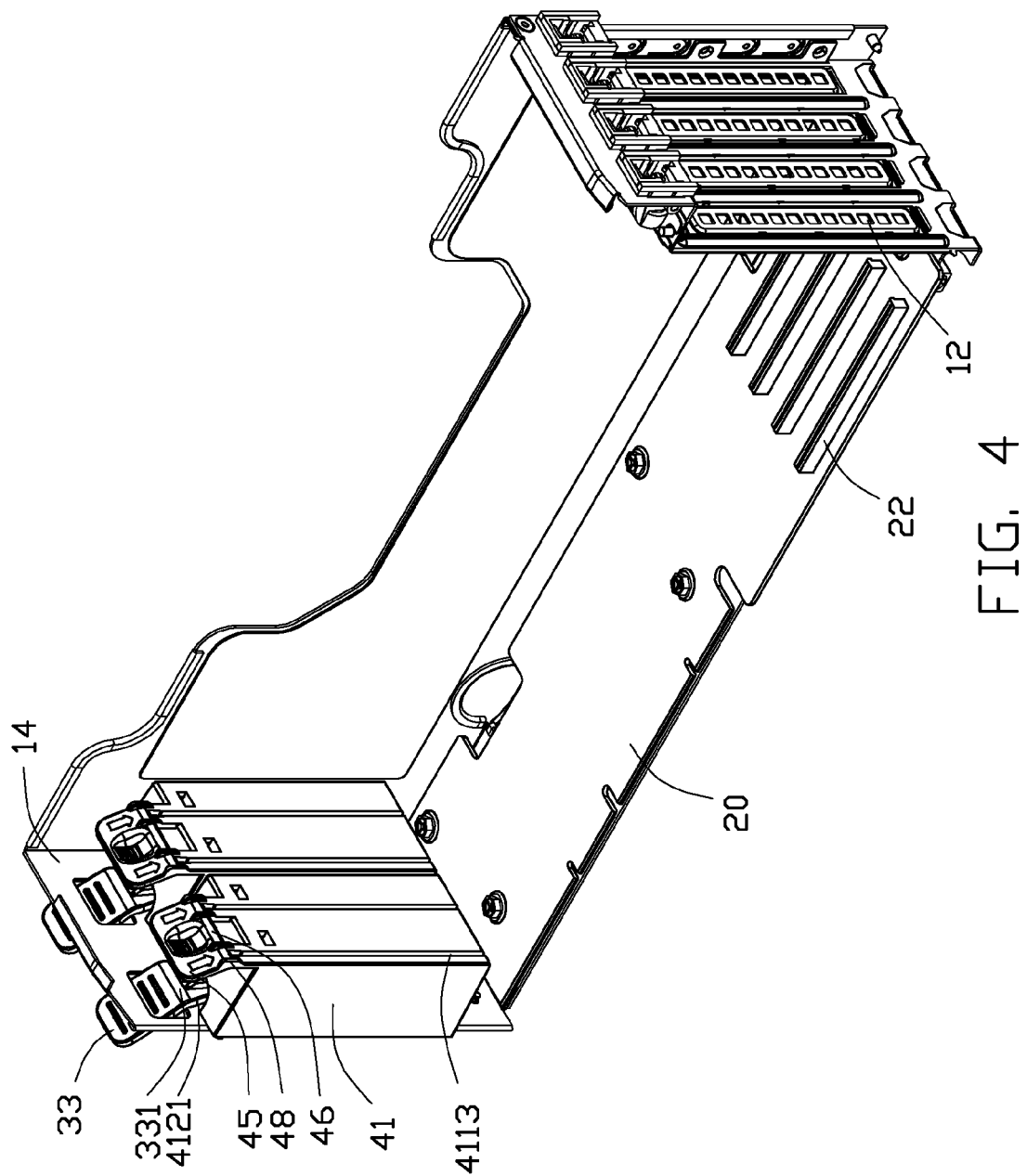
FIG. 4 is an assembled view of the mounting apparatus of FIG. 1 in a second state in which the first and second retaining members are both attached to the bracket.

Referring also to FIG. 2, each of the second retaining members 40 includes a hollow cubic body 41 and a resilient curved handle 45 extending from one end of the body 41. The body 41 includes an end wall 411, and a pair of sidewalls 412, 413 respectively extending perpendicularly from an upper end portion and a lower end portion of the end wall 411. The handle 45 is formed at a distal end of the end wall 411 of the body 41 away from the sidewall 413. The body 41 includes an opening 414 defined therein in alignment with the end wall 411. A semi-circular avoiding cutout 4121 is defined in a portion of the sidewall 412 away from the end wall 411. A pair of resilient catches 43 extends rearward from the sidewall 412 located beside the avoiding cutout 4121. A barb 4132 extends rearward from the sidewall 413. A pair of sliding slots 4113 is defined in an outside portion of the end wall 411. Referring to FIG. 4, a block edge 46 horizontally extends from the handle 45. Two pairs of spaced guiding tabs 48 extend from the block flange 46, each pair of the guiding tabs 48 sandwiching one sliding slot 4113.

Referring also to FIGS. 5 and 6, each of the first cards 500 includes a cover plate 503 formed at a first end 501 thereof, and a supporting extension 504 extending from a second end 502 thereof. Each of the second cards 600 includes a cover plate 603 formed at a first end 601 thereof and there is no supporting extension formed at a second end 602 of the expansion card 600.

The circuit board 20 is attached to the base wall 11 of the bracket 10, with the mounting posts 112 engaging in the mounting holes 24 of the bracket 10.

Figure 3:
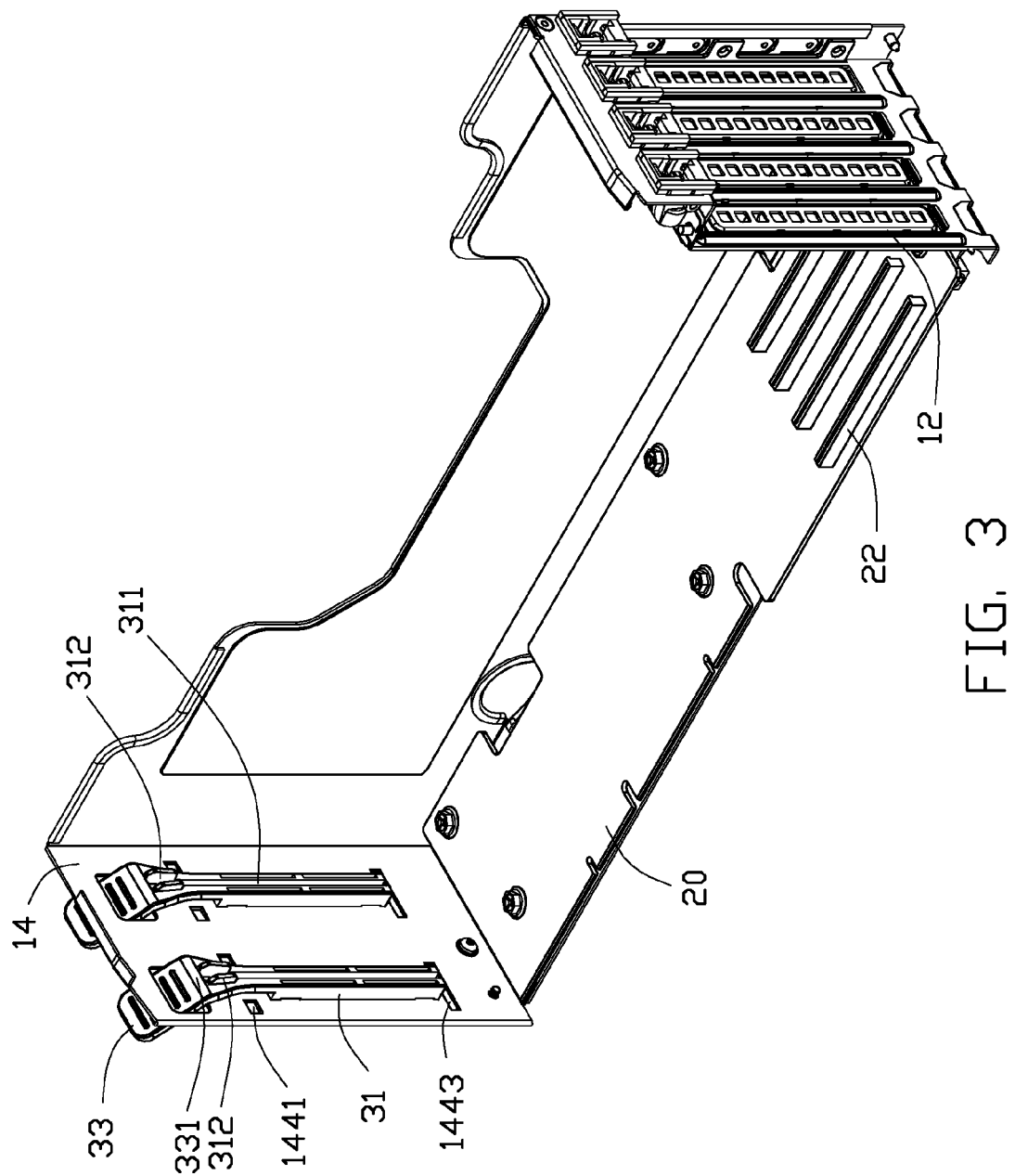
FIG. 3 is an assembled view of the mounting apparatus of FIG. 1 in a first state in which the first retaining members are attached to the bracket.

Referring to FIGS. 3 and 4, in assembly of the mounting apparatus, the first retaining members 30 are attached to the second sidewall 14 of the bracket 10, with the handles 33 of the first retaining members 30 extending through and engaging in the openings 1421 of the bracket 10 and the split posts 314 engaging in the through apertures 1423 of the bracket 10. The second retaining members 40 are attached to the second sidewall 14 of the bracket 10 partially shielding the first retaining members 30, with the catches 43 engaging in the through holes 1441 of the bracket 10 and the barbs 4132 engaging in the long slits 1443. The bars 31 of the first retaining members 30 are received in the bodies 41 of the second retaining members 40 and a portion of the bar 31 and the pairs of guiding tabs 312 are received in the avoiding cutouts 4121 of the second retaining members 40.

Referring to FIG. 5, to attach any one of the first cards 500 to the bracket 10, the catches 43 of the second retaining members 40 are deformed to release from the through holes 1441 of the bracket 10 to detach the second retaining members 40 from the bracket 10. The supporting extension 504 of the one expansion card 500 contacts the handle 33 and is received in a space between the two guiding tabs 312 of one of the first retaining members 30. The expansion card 500 is depressed toward the circuit board 20 and the guiding tabs 312 guide the supporting extension 504 to slide into the sliding slot 311 of the first retaining member 30. The handle 33 is deformed away from the expansion card 500. When a connector of the expansion card 500 engages in the corresponding socket 22 of the circuit board 20 and the supporting extension 504 moves below the block flange 331, the handle 33 restores toward the expansion card 500. The block flange 331 of the first retaining member 30 blocks the top of the supporting extension 504 of the expansion card 500 to position the expansion card 500. The cover plate 503 at the first end 501 of the expansion card 500 is mounted to the first sidewall 12 of the bracket 10 by a conventional fixing apparatus. To detach the expansion card 500 from the second sidewall 14 of the bracket 10, the handle 33 of the first retaining member 30 is deformed away from the expansion card 500 to release the supporting extension 504 of the expansion card 500 from the block flange 331.

Referring to FIG. 6, to attach one of the second cards 600 to the bracket 10, the second retaining members 40 are attached to the bracket 104, with the catches 43 and the barbs 4132 engaging in the through holes 1441 and the long slits 1443 of the bracket 10. The second end 602 of the one expansion card 600 contacts the handle 45 of one of the second retaining members 40 and is received in a space between one pair of the guiding tabs 48 of the second retaining member 40. The expansion card 600 is depressed toward the circuit board 20 and the pair of guiding tabs 48 guide the second end 602 of the expansion card 60 to slide into the corresponding sliding slot 4113 of the second retaining member 40. The handles 45 are deformed away from the expansion card 600. When a connector of the expansion card 600 engages in the corresponding socket 22 of the circuit board 20 and the second end 602 of the expansion card 600 moves below the block flange 46, the handle 45 restores toward the expansion card 600. The block flange 46 blocks the top of the second end 602 of the expansion card 600 to position the expansion card 600. The cover plate 603 at the first end 601 of the expansion card 600 is mounted to the first sidewall 12 of the bracket 10 by a conventional fixing apparatus. To detach the expansion card 600 from the second sidewall 14 of the bracket 10, the handle 45 of the second retaining member 40 is deformed away from the expansion card 600 to release the second end 602 of the expansion card 600 from the block flange 46.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for selectively mounting a first expansion card and a differently-sized second expansion card, wherein two cover plates are respectively formed at first ends of the first and second expansion cards, a supporting extension is formed at a second end of the first expansion card, the mounting apparatus comprising:
   a bracket comprising a base wall, a first sidewall, and a second sidewall opposite to the first sidewall, the cover plates of the first or second expansion card being fixed to the first sidewall to mount the first or second expansion card to the bracket;
   a first retaining member attached to the second sidewall of the bracket, and defining a sliding slot to receive the supporting extension of the first expansion card in response to the first expansion card being mounted to the bracket; and
   a second retaining member attached to the second sidewall of the bracket, and comprising an end wall defining a sliding slot to receive the second end of the second expansion card in response to the second expansion card being mounted to the bracket, wherein the first retaining member is located between the second sidewall of the bracket and the end wall of second retaining member, the slide slot of the first retaining member is shielded by the end wall of the second retaining member.

2. The mounting apparatus of claim 1, wherein the second sidewall of the bracket comprises a rectangular opening, and two through apertures below the opening, the first retaining member comprises a bar with two split posts, and a resilient handle slantingly extending from one end of the bar, the split posts engage in the through apertures, the resilient handle engages in the opening.

3. The mounting apparatus of claim 2, wherein the sliding slot of the first retaining member is defined in a side of the bar and faces the first sidewall of the bracket, the first retaining member further comprises a pair of spaced guiding tabs extending from the bar and located above the sliding slot for guiding the supporting extension of the first expansion card to slide into the sliding slot.

4. The mounting apparatus of claim 3, wherein the handle of the first retaining member comprises a block flange formed above the guiding tabs to block the supporting extension of the first expansion card.

5. The mounting apparatus of claim 2, wherein the second sidewall of the bracket comprises two rectangular through holes, and a slit respectively located below the opening and the through aperture, the second retaining member comprises a hollow body for receiving the bar of the first retaining member, the body comprises the end wall, and a pair of sidewalls extending perpendicularly from two opposite end portions of the end wall, a pair of catches and a barb respectively extend from the two sidewalls of the body to engage in the through holes and the slit.

6. The mounting apparatus of claim 5, wherein one of the sidewalls of the body of the second retaining member comprises a semi-circular avoiding cutout for the bar of the first retaining members extending therethrough.

7. The mounting apparatus of claim 5, wherein the second retaining member comprises a resilient curved handle formed at one end of the end wall of the body, a block flange is formed at the handle to block the second end of the second expansion card.

8. The mounting apparatus of claim 7, wherein two pairs of spaced guiding tabs extend from the block flange of the second retaining member and respectively sandwiching the sliding slots of the end wall for guiding the second end of the second expansion card to slide into one of the sliding slots.

9. A mounting apparatus to selectively retain a first expansion card and a second expansion card with a smaller size than a size of the first expansion card, the mounting apparatus comprising:
   a bracket comprising a base wall, and first and second sidewalls perpendicularly extending from opposite sides of the base wall;
   a first retaining member attached to the second sidewall of the bracket, and defining a sliding slot; and
   a second retaining member attached to the second sidewall of the bracket, and comprising an end wall defining a sliding slot to engage with a second end of the second expansion card in response to a first end of the second expansion card being fixed to the first sidewall of the bracket;

wherein the first expansion card is retained in the bracket by fixing a first end of the first expansion card to the first sidewall of the bracket and engaging the second end of the first expansion card in the sliding slot of the first retaining member, in response to the second retaining member being detached from the bracket.

10. The mounting apparatus of claim 9, wherein the second sidewall of the bracket comprises a first mounting unit to mount the first retaining member, and a second mounting unit to mount the second retaining member.

11. The mounting apparatus of claim 9, wherein the first retaining member comprises a resilient handle, and the handle comprises a block flange for blocking a supporting extension of the first expansion card.

12. The mounting apparatus of claim 11, wherein the first retaining member comprises a pair of spaced guiding tabs located at one end of the sliding slot to guide the support extension of the first expansion card to slide into the sliding slot.

13. The mounting apparatus of claim 9, wherein the second retaining member comprises a hollow body bounded by the end wall, and a pair of sidewalls extending perpendicularly from two opposite end portions of the end wall, and a resilient handle formed at one end of the end wall of the body, a part of the first retaining member is received in the body.

14. The mounting apparatus of claim 13, wherein a block flange is formed at the handle of the second retaining member to block the second end of the second expansion card.

* * * * *